May 21, 1968
A. V. DIEHL
3,384,384
TRAILER SUSPENSION ASSEMBLY
Filed Dec. 2, 1966
3 Sheets-Sheet 1
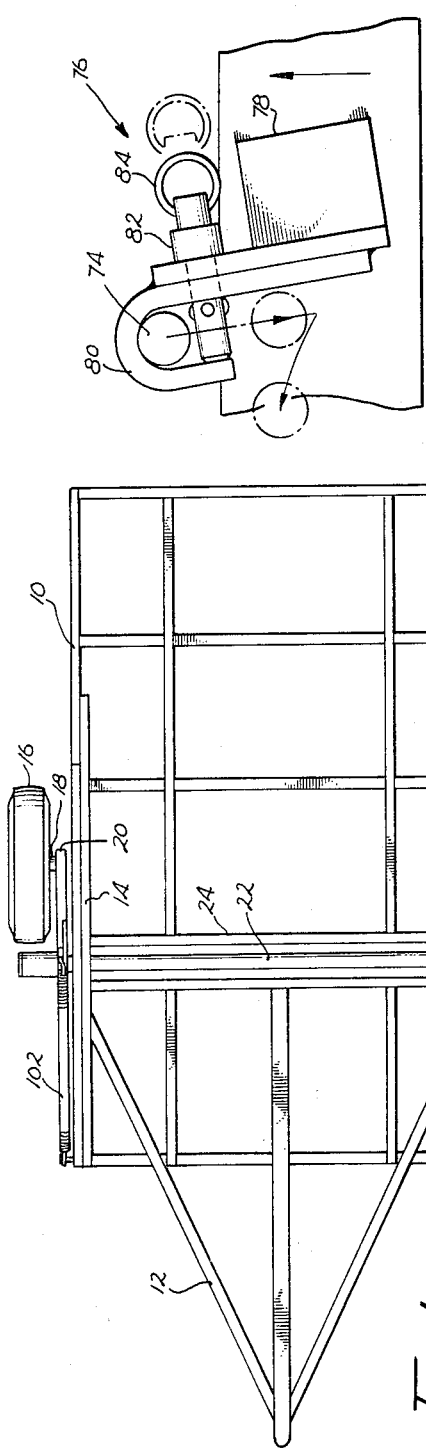
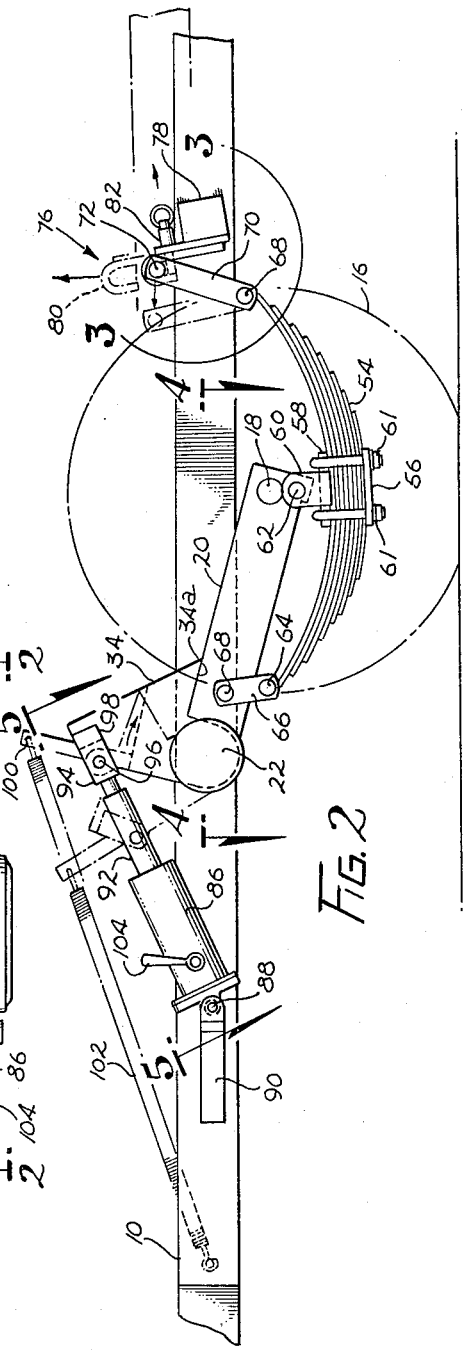
ALAN V. DIEHL,
INVENTOR.
BY R. E. Geangue
ATTORNEY

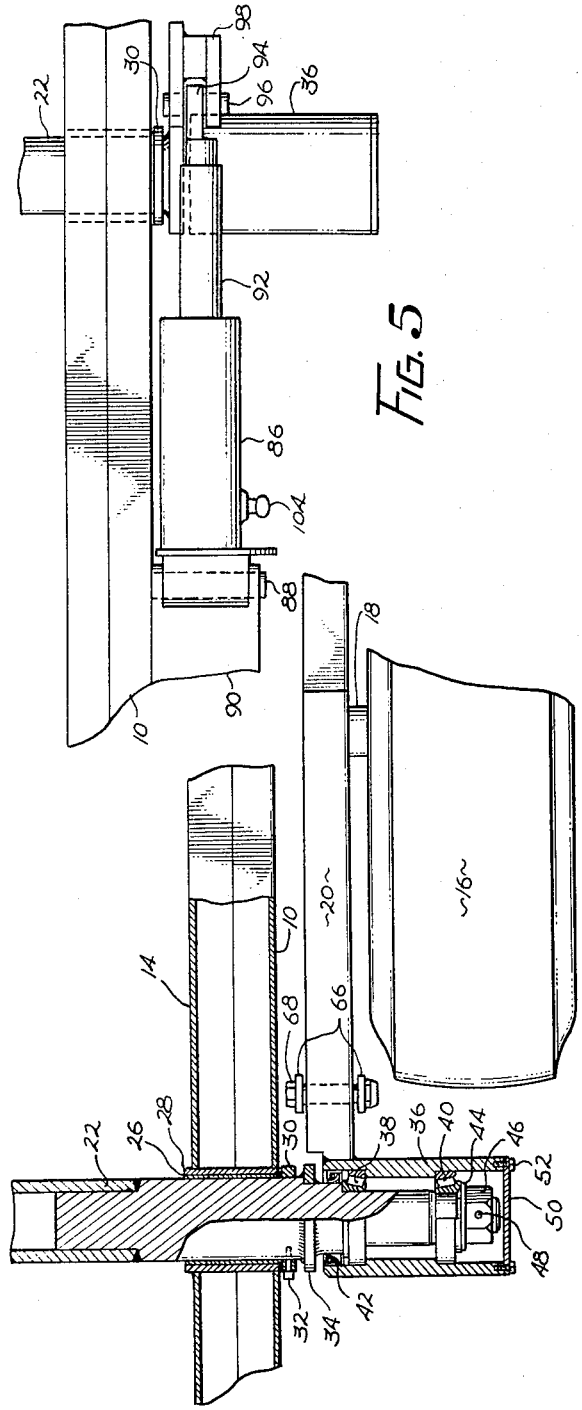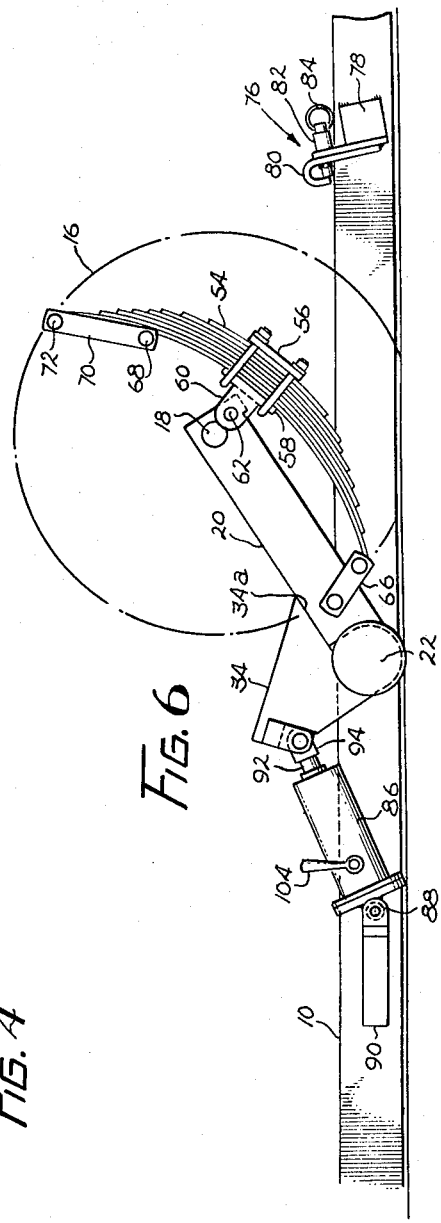

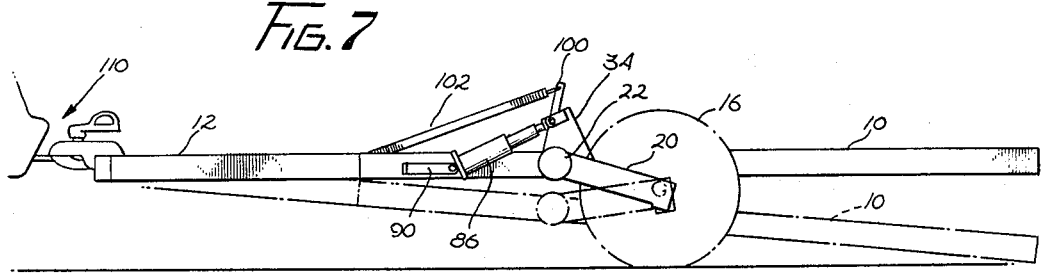
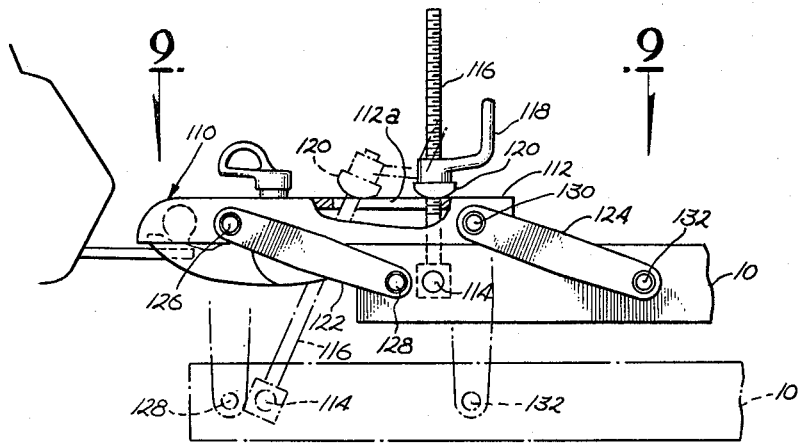
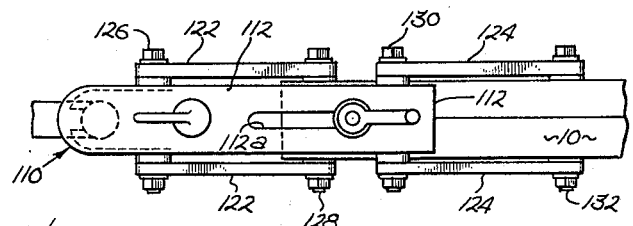
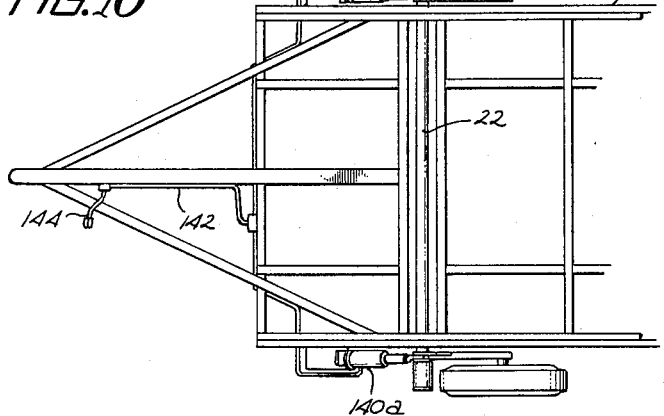

United States Patent Office 3,384,384
Patented May 21, 1968

3,384,384
TRAILER SUSPENSION ASSEMBLY
Alan V. Diehl, 11144 Wystone Ave.,
Northridge, Calif. 91324
Filed Dec. 2, 1966, Ser. No. 598,796
12 Claims. (Cl. 280—43.18)

This invention relates to trailers for carrying heavy loads, and, more particularly, to an improved trailer suspension assembly that permits one end or both ends of the trailer bed to be lowered and lifted to and from ground level.

Heretofore, devices have been proposed for raising and lowering trailers for loading and unloading purposes. However, these devices are not used to any great extent, primarily because most of them utilize expensive spring means of special construction or dual hydraulic cylinders operated by a single pump with associated complicated valves, fittings and hoses. Also, many of these prior art devices will not lower the trailer bed completely to the ground so that the bottom of the frame rests directly on the ground. Furthermore, many of the constructions do not lend themselves to carrying heavy loads, such as back hose or fork fits, or do not allow a sufficiently wide load space between their wheels to permit hauling of wide implements or vehicles such as are commonly used in earth moving applications. An additional disadvantage is that most such devices do not keep both sides of the trailer in synchronization, so that it is prevented from tipping during the raising and lowering operation.

Therefore, a primary object of the present invention is to provide a trailer suspension that obviates the foregoing disadvantages. This is accomplished by providing a torque tube or bar that extends transversely of the trailer. One end of the torque tube may be rotated by a hydraulic jack against the restraining and returning force of a spring acting against the other end of the torsion tube. In a second embodiment, hydraulic jacks are provided for both ends of the torsion tube, actuated by a common supply. In either embodiment, means may also be provided for raising and lowering the end of the trailer that is attached to the towing unit, without detaching the trailer from the towing unit. The latter feature is particularly valuable when it is necessary to keep the trailer bed horizontal during raising and lowering.

One of the principal advantages of the present inventions is that the device is in no way dependent on the raising and lowering means when the trailer is being towed. Thus, any malfunction of the raising and lowering means in no way affects the safe hauling of the trailer; in other words, the device is "fail-safe" so far as affecting safe operation of a towing vehicle is concerned. The suspension utilizes conventional leaf springs, which are not in mechanical series with the raising and lowering means for the trailer bed. The springs are disconnectable from the trailer frame for purposes of raising and lowering the frame.

Additional advantages and features of the invention will become apparent from the following description, taken in conjunction with the accompanying drawings, in which:

FIGURE 1 is a plan view of one embodiment of the invention;

FIGURE 2 is an elevational view on the line 2—2 of FIGURE 1;

FIGURE 3 is a detailed view of the spring locking and release mechanism shown in FIGURE 2;

FIGURE 4 is a partial sectional view taken on the line 4—4 of FIGURE 2;

FIGURE 5 is a partial plan view taken on the line 5—5 of FIGURE 2;

FIGURE 6 is an elevational view of the embodiment shown in FIGURE 2 in its lowered position;

FIGURE 7 is an elevational view useful in understanding the operation of the invention;

FIGURE 8 is an elevational view of means for lowering and raising the front or towing end of the trailer;

FIGURE 9 is a plan view of the device shown in FIGURE 8; and

FIGURE 10 is a plan view of another embodiment of the invention.

FIGURES 1 through 7 illustrate one embodiment of the invention in which the suspension assembly is applied to a conventional rectangular trailer frame 10. The frame 10 is provided with triangular hitching means 12 of conventional variety for securing it to a towing vehicle such as a truck (not shown). The suspension assembly includes an H-shaped hanger 14, which supports two oppositely disposed wheels 16 and the raising and lowering mechanism to be hereinafter described in detail. As most clearly shown in FIGURES 1, 2 and 4, the wheels 16 are rotatably supported on conventional axles 18 secured to swing arms 20 that are part of the suspension system on each side of the trailer. The swing arms 20 to which the wheels 16 are secured are in turn secured to a torque tube or bar 22 that extends transversely of the trailer frame 10 and through the frame and hanger.

The torque tube 22 provides one of the principal advantages of the present invention in that torque is transmitted through it from one side to the other of the trailer to raise and lower the suspension assembly, and it also serves to maintain synchronization between the two sides of the suspension mechanism while it is being raised and lowered. The torque tube is in no way connected to the towing mechanism of the trailer and any malfunction of the torque mechanism in no way affects the trailer towing mechanism, because the suspension system is locked when the trailer is in its raised position.

The torque tube 22 extends through a channel member 24 that forms part of the hanger, and is welded to the frame 10. The torque tube 22 extends through and is journaled in the hanger 14, as best shown in detail in FIGURE 4. FIGURE 4 illustrates only the end of the torque tube 22 which is hydraulically actuated and not the end that is spring-biased. However, that arrangement is shown in FIGURE 1 and will be readily understood by those skilled in the art.

Looking now at that figure, it is seen that the torque tube 22 extends through the frame 10 and the hanger 14, which are provided with conventional bronze bearings 26 and grease fittings (not shown). The bearings fit inside a sleeve 28 secured to and extending through the hanger 14. Just ouside the hanger 14 a circular collar 30 is secured to the torque tube 22 by means of a screw 32 to center the tube and prevent its sliding in its bearing 26. Also secured to the torque tube 22, as by welding, is a lift arm 34, which is best seen in FIGURE 2, and will be later described in detail.

The swing arm 20 is welded or otherwise secured to a sleeve 36 and surrounds the outer end of the torque tube 22. The sleeve 36 is provided with two sets of tapered roller bearing cones 38 and 40 and with a grease seal 42. The grease seal 42 serves to keep dust and dirt out of the bearing mechanism and, of course, to retain grease within the rotatable portion of the mechanism. The torque tube 22 is threaded at its lower end, and a washer 44 and a nut 46 hold the bearing cone 40 in place. The bearing cone 38 is held in place between opposed shoulders on the torque tube 22 and the sleeve 36. If desired, a cotter pin may be inserted through an aperture 48 in the nut 46 and the lower end of the torque tube 22 to prevent the nut 46 from loosening. A dust cover 50 is secured by screws 52 to the end of the sleeve 36.

Rotation of the lift arm 34 causes upward and downward movement of the swing arm 20 and raises and lowers the trailer bed. Power to rotate the lift arm is provided by a hydraulic jack and ram, as will be particularly described with reference to FIGURES 2, 5 and 6.

The wheels 16 are suspended from conventional, longitudinally-extending leaf springs 54 by means of clamping arrangements. The leaf springs 54 are secured to the swing arms 20 by means of conventional U-bracket assemblies 56 whose upper ends are secured by plates 58 to a second U-bracket 60. Bolts 61 extending through the bracket 56 and the plate 58 are tightened down to securely clamp the spring between the brackets 56 and 60. Each bracket 60 is pivotally secured to one end of each swing arm 20 by means of a bolt 62. One end of each leaf spring 54 is connected by means of a shackle bolt 64 to one end of a link plate 66, whose other end is connected by a shackle bolt 68 to the swing arm 20. The other end of each leaf spring 54 is supported through a shackle bolt 68 to first ends of a pair of link plates 70. The other ends of the link plates 70 are held together by a shackle bolt 72 which sandwiches a bushing 74 (FIGURE 3) between the link plates 70. The link plate assembly comprising the link plates 70, the bolt 72 and the bushing 74 is free to rotate on the shackle bolt 68.

The means for supporting the rear end or right-hand end (as seen in FIGURE 2) of each leaf spring 54 is best seen in FIGURE 3. As there shown, it comprises a locking mechanism shown generally by the numeral 76. The locking mechanism 76 comprises a bracket 78 that is welded or otherwise secured to the hanger 14. A hook-shaped member 80 welded to the bracket 78 is positioned to receive the bushing 74 and restrain its upward movement. Its downward movement is restrained by a ball lock pin 82 that extends through the member 80. Suitable ball lock pins 82 are well known in the art and are manufactured by Avdel, Inc., Burbank, Calif., for example. The ball lock pin 82 is provided with a ring 84 through its outer end, so that it may be pulled outwardly to the position shown in broken lines in FIGURE 3 to release the bushing 74 from the member 80, when it is desired to lower the trailer as shown in FIGURE 6.

Raising and lowering of the trailer bed is accomplished by means of a hydraulic cylinder arrangement best shown in FIGURES 2, 5 and 6. As there shown, a hydraulic jack 86 has one end pivotally secured by a pin 88 to a bracket 90 welded or otherwise secured to the trailer frame 10. The jack 86 has a jack ram 92, which is provided at its outer end with a lug 94. The lug 94 is pivotally attached by means of a pin 96 to a clevis 98 and to the lift arm 34. As previously pointed out, the lift arm 34 has a portion 34a that bears against the swing arm 20. Therefore, as the ram 92 of the jack 86 is extended and retracted, the torque tube 22 will be moved upwardly and downwardly and, if the locking mechanism 76 is released, the right end of the trailer (as seen in FIGURE 2) will be raised and lowered.

The hydraulic jack 86 may be of any conventional type but in the embodiment shown in FIGURES 1 through 6 is of the manually operated type. Such jacks are well known in the art and suitable ones are manufactured by Wm. S. Pine, Inc., Los Angeles, Calif. Alternatively, the jack may be a hydraulic cylinder operated by pumping means (not shown) carried on the trailer or on the towing vehicle. Suitable cylinders are manufactured by Cross Manufacturing, Inc., Lewis, Kans.

In the particular embodiment of the invention shown in FIGURES 1 through 6, rotational motion is applied only to one end of the torque tube 22 by means of the hydraulic jack 86, through the lift arm 34 and is transmitted through the tube to another lift arm mounted on its other end. The swing arm mounted on the end of the torque tube 22 remote from the jack has an extension 100 extending upwardly therefrom, which is connected to one end of a spring 102 whose other end is affixed to the frame 10. The purpose of the spring 102 is to return the torque tube assembly 22, 24, and the lift arm 34 out of contact with the swing arms 20 so that the axle, swing arms and spring assembly are free to move as the trailer is being towed. In the normal running position, the lift arms 34 are retracted, which allows the swing arms 20 and wheels 16 to move freely supported by the leaf springs 54.

When the trailer is in a normal operating position, in order to lower it the pins 82 are pulled outwardly to the position shown in FIGURE 3. The jack 86 is then pumped by means of a handle 104 until the lift arm 34 contacts the swing arm 20 and raises the frame 10 until the shackle bolt and bushing 72, 74, are free of the hook 80. Then the link plate assembly at the right end of the leaf spring is swung counterclockwise to clear the locking mechanism 76. After that, a control valve (not shown) on the jack 86 is released to allow the ram 92 to retract and lift the lift arm 34 and enable it to rotate in a counterclockwise direction about the pivot 96, which lowers the torque tube 22 together with the trailer bed 10. Looking at it another way, the wheels 16 are raised by the action of the jack 86, so that the trailer bed appears to be lowered rather than the wheels 16 being raised, which is actually the case.

To raise the trailer bed back to its towing position, the valve on the jack 86 is closed and the jack is pumped up until the link plate assembly can be swung back in a clockwise direction and be engaged by the hook 80 on the locking mechanism 76. Then, the valve on the jack is opened allowing the trailer frame to lower so that the bushing 74 is engaged by the hook 80 which supports the load of the leaf spring 22.

The valve on the jack 86 is left open and the return spring 102 causes the lift arm 34 to disengage themselves from the swing arms 20 so that the wheel assembly is free to move upwardly and downwardly as the trailer is towed.

As shown in FIGURE 7, the front, or left end, of the trailer is supported at a fixed distance above the ground by means of a conventional ball and socket hitch, designated generally by the numeral 110. Thus, as the trailer bed is raised and lowered, it pivots about the hitch so that in its lowered position it is tilted slightly as shown in broken lines in FIGURE 7. In most applications, the tilt of the trailer in its lowered position is not sufficient to be troublesome, inasmuch as it makes an angle with the horizontal of approximately ten degrees or less. However, if such tipping of the trailer is undesirable, because of the weight of the load or for other reasons, raising and lowering means may be provided for the hitch, which permits the trailer bed to be lowered to a position substantially parallel to the ground. Such an arrangement is shown in FIGURES 8 and 9.

The conventional ball and socket hitch 110 is mounted on a hollow rod-like member 112, which has a longitudinal slot 112a therethrough. Pivotally secured to the frame 10, as at 114, is a threaded stud 116 extending upwardly through the slot 112a and provided with a handle 118 which thrusts a bearing 120 against the member 112 when the handle is tightened down on the stud 116.

The front end of the trailer frame 10 is supported from the member 112 by means of a parallelogram arrangement of linkages 122 and 124. The linkages 122 are pivotally secured together at their first ends by bolts 126 through the member 112, and at their other ends by bolts 128 through the frame 10. Similarly, the linkages 124 are pivotally secured together at their first ends by means of bolts 130 through the member 122 and at their other ends by means of bolts 132 extending through the frame 10. As the handle 118 is loosened, thus relieving pressure of the bearing 120 from the member 112, the frame 10 is lowered and swung forward to the position shown in broken lines in FIGURE 8. The linkages 122 and 124 and the threaded stud 116 are of sufficient length to permit the hitch end of the trailer 10 to be lowered to the ground. Although FIGURES 8 and 9 shown only manual means for lowering the front end of the trailer, it is understood that hydraulic or other means may be provided.

FIGURE 10 illustrates an embodiment of the invention that is particularly adapted to a trailer for carrying extremely heavy loads. The embodiment there shown is very similar to that shown in FIGURES 1 through 7 but utilizes two hydraulic cylinders 140a and 140b, which actuate lift arms located on opposite sides of the trailer. Both lift arms are, of course, mounted on the torque tube 22 which acts as a mechanical equalizer for the two hydraulic cylinders 140. The hydraulic cylinders may be driven by one hydraulic pump (not shown) through a line 142. The hydraulic pump may be located on the trailer or on the towing vehicle and connected by a flexible line 144 to the cylinders 140.

Although several embodiments of the invention have been shown and described, it is apparent that many modifications may be made therein by one skilled in the art without departing from the true spirit and scope of the invention.

What is claimed is:

1. A suspension assembly for a trailer to be secured to towing means and having a frame and two wheels rotatably mounted on axles on opposite sides of said frame, the suspension assembly comprising:

longitudinally-extending spring means for each of said wheels;

means for releasably securing one end of each of said spring means to said frame;

torque transmitting means extending transversely across said frame and rotatably supported in said frame on opposite sides thereof;

a pair of first linkage means located on opposite sides of said frame;

said pair of first linkage means having first ends respectively supporting said axles and also rotatably supporting said spring means substantially at mid-points of said spring means;

said pair of first linkage means having second ends rotatably connected to opposite ends of said torque transmitting means;

a pair of second linkage means having first ends respectively pivotally connected to second ends of said spring means and having second ends respectively pivotally connected to said pair of first linkage means intermediate said first and second ends of said first linkage means;

lift arm means secured to said torque transmitting means and engageable with at least one of said first linkage means; and extendible means secured at one end to said frame and pivotally connected at a second end to said lift arm means to rotate said torque transmitting means and raise and lower a first end of said frame remote from said towing means to and from ground level.

2. The assembly defined in claim 1, wherein said spring means comprise leaf springs.

3. The assembly defined by claim 1, wherein said lift arm means comprise a pair of lift arms secured to said torque transmitting means at opposite ends thereof.

4. The assembly defined by claim 3, wherein said extendible means is connected to one of said lift arms.

5. The assembly defined by claim 4, wherein return spring means is connected between said frame and a second of said lift arms.

6. The assembly defined by claim 3, wherein said extendible means are connected to both of said lift arms.

7. The assembly defined by claim 4, wherein said extendible means comprise a hydraulic cylinder.

8. The assembly defined by claim 6, wherein said extendible means comprise two hydraulic cylinders.

9. The assembly defined by claim 7, wherein said hydraulic cylinder is manually actuatable.

10. The assembly defined by claim 8, wherein said two hydraulic cylinders are simultaneously actuatable.

11. The assembly defined by claim 7, wherein said torque transmitting means is a tube.

12. The assembly defined by claim 8, wherein said torque transmitting means is a tube.

References Cited

UNITED STATES PATENTS

| | | | |
|---|---|---|---|
| 2,719,726 | 10/1955 | Johnston | 280—43.18 |
| 2,754,128 | 7/1956 | Schramm | 280—43.18 |
| 2,834,599 | 5/1958 | Sarchet | 280—30 |
| 2,905,481 | 9/1959 | Schramm | 280—43.18 |
| 3,342,505 | 9/1967 | Diehl | 280—43.18 |

RICHARD J. JOHNSON, *Primary Examiner.*

J. SEIGEL, *Assistant Examiner.*